3,418,166
ALKALINE STORAGE CELL HAVING SILICATE DISSOLVED IN THE ELECTROLYTE

Herbert Donald Carter, Claverdon, England, assignor to Alkaline Batteries Limited, Redditch, England, a company of Great Britain
No Drawing. Filed Oct. 6, 1964, Ser. No. 402,013
10 Claims. (Cl. 136—24)

The invention relates to alkaline storage cells of the type which use a cadmium active material or an iron active material in the negative electrode. An object of the invention is to extend the life of the negative active material of such a cell.

According to the present invention an alkaline storage cell having a cadmium or iron negative active material is characterised by a silicate dissolved in the electrolyte.

The silicate must of course be soluble in the electrolyte and will normally comprise an alkali metal silicate and will preferably comprise a sodium or potassium silicate, such as potassium metasilicate $K_2SiO_3$.

The silicate may be incorporated either by adding it direct to the electrolyte or by adding it to the positive active material or to the negative active material during the process of manufacture, or by soaking the individual plates in a solution of the silicate after manufacture.

The preferred concentration of silicate in the electrolyte within the alkaline storage cell is of the order of 2 grams per litre calculated as silicon dioxide $SiO_2$, but may be within the range 0.5 to 5 grams per litre calculated as silicon dioxide $SiO_2$. It will be appreciated that this calculation may be done by any of the known methods. The presence of silicate in excess of this range tends to reduce the capacity available from the negative active material, but when present at the preferred concentration the capacity available is not affected to any significant degree whilst the life of the cell, measured in cycles of charge and discharge, is perceptibly improved even when such cycles involve excessive overcharge and/or overdischarge of the cell. The addition of a silicate is beneficial not only in the initial manufacture of a cell but also in restoring a cell when its capacity has deteriorated.

Thus according to one aspect of the invention a process of making an alkaline storage cell having a cadmium or iron negative active material includes incorporating in the positive active material or in the negative active material a silicate soluble in the electrolyte. According to another aspect of the invention a process of restoring an alkaline storage cell having a cadmium or iron negative active material when its capacity has deteriorated, includes replacing the electrolyte with fresh electrolyte containing added silicate dissolved in it.

It is well known that the available capacity of the positive plates of an alkaline storage cell should be less than that available at the negative plates in order to ensure long life. This requires a greater weight of cadmium, which is a very expensive material, than is demanded by the capacity at which the cell is rated. By insuring that the capacity of the negative active material is maintained on cycling the invention enables the weight of cadmium negative active material employed in the cell to be reduced and so reduces the cost of the cell.

The invention is also of value in restoring the capacity of negative active material which has been reduced by misuse in service, and in particular in the case of cells the capacity of whose negative active material (either cadmium or iron) has been reduced by cycling in electrolyte containing large quantities of potassium carbonate. Such use may eventually give a negative material with only about one half of its original capacity or even less, with the active material reduced to a state approaching the metallic state and incapable of complete discharge.

A process of repeatedly changing the electrolyte during cycling will sometimes restore capacity but it is found that the application of the invention, namely the addition of a silicate, for example an alkali metal silicate, preferably a sodium or potassium silicate, to the electrolyte, after having changed the electrolyte, to reduce the carbonate content to an acceptable value offers a more certain method of restoring capacity. The silicate content of the electrolyte may be adjusted to about 1 to 2 grams per litre calculated as silicon dioxide $SiO_2$ and the cells returned for duty. On subsequent cycles the capacity increases and eventually becomes normal. In some cases where the original misuse was of short duration immediate restoration of capacity results.

As a means of rapidly restoring the capacity of a negative active material that has been abused larger concentrations of silicate may be employed. For example if a cell is giving only about one half of its rated capacity and it is known that this is due to defective negative material the following process may be used to restore the cell's capacity.

Silicate is added to the electrolyte up to 20 grams per litre calculated as silicon dioxide $SiO_2$; the cell is then charged up to its full capacity and discharged at the normal rate. Often it is found that only a very low capacity will then be given. The concentration of silicate is then determined, calculated as silicon dioxide $SiO_2$; a value intermediate between 10 grams per litre and 20 grams per litre calculated as $SiO_2$ is likely to be obtained though this is usually nearer the higher figure. The free electrolyte is removed from the cell and replaced by fresh electrolyte containing no added silicate and the process of charge and discharge repeated. It will be found that a slightly higher capacity is given. The silicate concentration in the electrolyte is again determined and the process of removing the free electrolyte from the cell, replacing it with electrolyte containing no added silicate, charging and discharging the cell is repeated until the concentration of silicate in the electrolyte in the cell after discharge is about 1.0 to 2.0 grams per liter calculated as silicon dioxide $SiO_2$. The number of times this process of adding large quantities of silicate, and then cycling and changing electrolyte to reduce the silicate concentration to the preferred concentration of 1.0 to 2.0 grams per litre calculated as silicon dioxide $SiO_2$ has to be repeated depends on the initial state of the cell; but, once the silicate concentration in the electrolyte at the end of the process is within the range 1.0 to 2.0 grams per litre calculated as silicon dioxide $SiO_2$ an improvement in the capacity is observed.

What I claim as my invention and desire to secure by Letters Patent is:

1. An alkaline storage cell having a negative active material selected from the group consisting of cadmium and iron and a liquid electrolyte comprising an aqueous solution of alkali and a silicate, said silicate being present in said electrolyte while said cell is in the charged condition, the concentration of said silicate when said cell is in the discharged condition following said charged condition being within the range of 0.5 to 5 grams per litre of electrolyte calculated as silicon dioxide.

2. An alkaline storage cell as claimed in claim 1 wherein the concentration of silicate in the electrolyte when said cell is in said discharged condition is 2 grams per litre calculated as silicon dioxide.

3. An alkaline storage cell as claimed in claim 1 wherein said silicate is an alkali metal silicate.

4. An alkaline storage cell as claimed in claim 3, wherein said alkali metal silicate is taken from the group consisting of a sodium silicate and a potassium silicate.

5. An alkaline storage cell as claimed in claim 4 wherein said potassium silicate is potassium metasilicate.

6. An alkaline storage cell having electrodes, a negative active material selected from the group consisting of cadmium and iron, and liquid electrolyte comprising an aqueous solution of alkali, the active material of one of said electrodes comprising a silicate which is soluble in the electrolyte said silicate being present in the electrolyte while said cell is in the charged condition in an amount sufficient to produce in the electrolyte when said cell is in the discharged condition following said charged condition a concentration within the range of 0.5 to 5 grams per litre calculated as silicon dioxide.

7. An alkaline storage cell as claimed in claim 6 wherein the amount of silicate present in the active material of one of said electrodes is sufficient to produce a concentration of said silicate in said electrolyte when said cell is in said discharged condition of 2 grams per litre calculated as silicate dioxide.

8. An alkaline storage cell as claimed in claim 7 in which said silicate is an alkali metal silicate.

9. An alkaline storage cell as claimed in claim 8 wherein said alkali metal silicate is selected from the group consisting of a sodium silicate and a potassium silicate.

10. An alkaline storage cell as claimed in claim 9, wherein said potassium silicate is potassium metasilicate.

References Cited

UNITED STATES PATENTS

| | | | |
|---|---|---|---|
| 1,920,151 | 7/1933 | Ruben | 136—153 X |
| 2,861,116 | 11/1958 | Grubb | 136—153 X |
| 3,056,647 | 10/1962 | Amphlett | 136—153 X |
| 858,862 | 7/1907 | Edison | 136—157 |
| 1,541,699 | 6/1925 | Freeth et al. | 136—157 |
| 3,150,012 | 9/1964 | Tanaka | 136—157 |

WINSTON A. DOUGLAS, *Primary Examiner.*

A. SKAPARS, *Assistant Examiner.*

U.S. Cl. X.R.

136—25, 154